US006511120B1

(12) United States Patent
Mitts

(10) Patent No.: US 6,511,120 B1
(45) Date of Patent: Jan. 28, 2003

(54) VEHICLE DOOR HINGE ATTACHMENT SYSTEM AND METHOD

(75) Inventor: Richard K. Mitts, Fullerton, CA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/497,243

(22) Filed: Feb. 3, 2000

(51) Int. Cl.[7] ................................................ B60R 27/00

(52) U.S. Cl. .................... 296/202; 296/146.11; 16/382; 411/82; 411/82.2; 411/84; 411/85; 411/903; 49/399

(58) Field of Search ............................ 296/202, 146.11; 16/382, 254, 272; 411/82, 82.2, 84, 85, 930; 49/501, 399

(56) References Cited

U.S. PATENT DOCUMENTS 5,644,817 A * 7/1997 Bender et al. ................ 16/382
6,038,740 A * 3/2000 Hoger et al. .................. 16/382
6,058,673 A * 5/2000 Wycech ..................... 52/721.4

FOREIGN PATENT DOCUMENTS

JP 0164622 * 6/1989 ................. 296/202

* cited by examiner

*Primary Examiner*—D. Glenn Dayoan
*Assistant Examiner*—Lori L Coletta
(74) *Attorney, Agent, or Firm*—Fletcher, Yoder & Van Someren

(57) ABSTRACT

A reinforcing nut plate (40) contacts one surface of an automotive vehicle body pillar (28) with hot-melt adhesive bodies (52) therebetween. A door hinge plate (15) is secured to the pillar (28) and nut plate (40) by one or more bolts (20,22) providing a predetermined mounting arrangement. On rust-proofing or other manufacturing treatment raising the door temperature a significant amount, the adhesive bodies affix the nut plate to the pillar. Now, the door may be removed from the pillar and transported to another work site for accessories to be mounted, following which the door can be readily reinstalled to the predetermined arrangement with the pillar and nut plate.

20 Claims, 2 Drawing Sheets

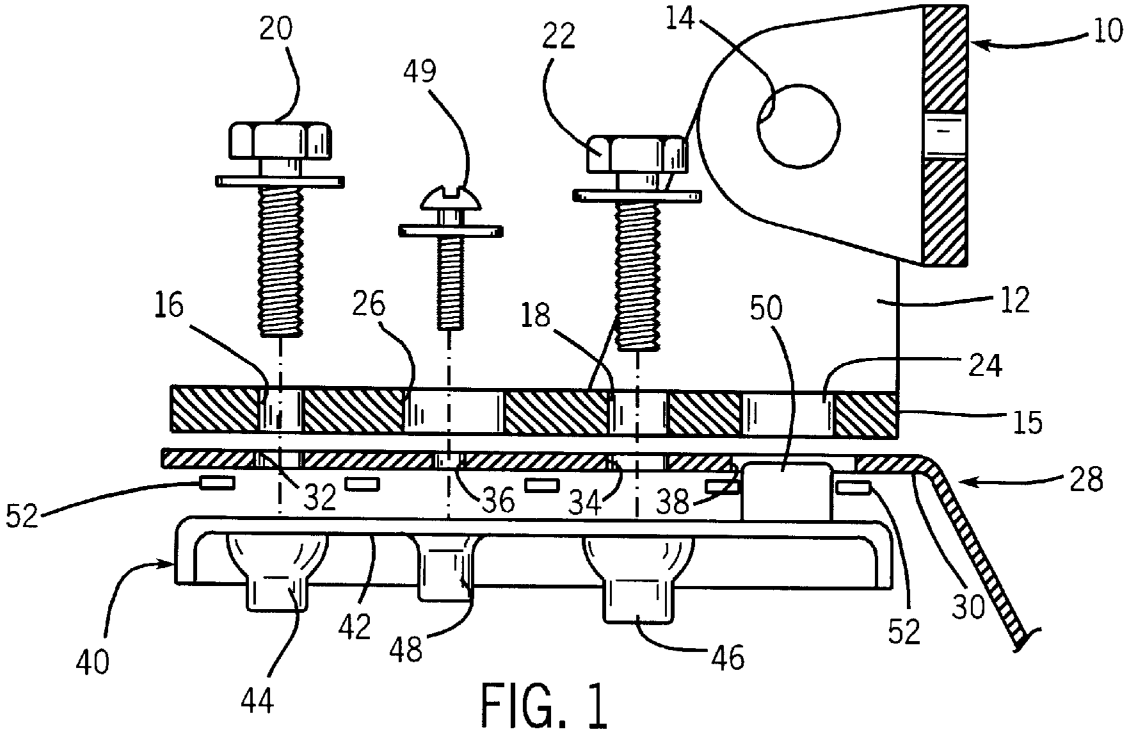
FIG. 1
FIG. 2
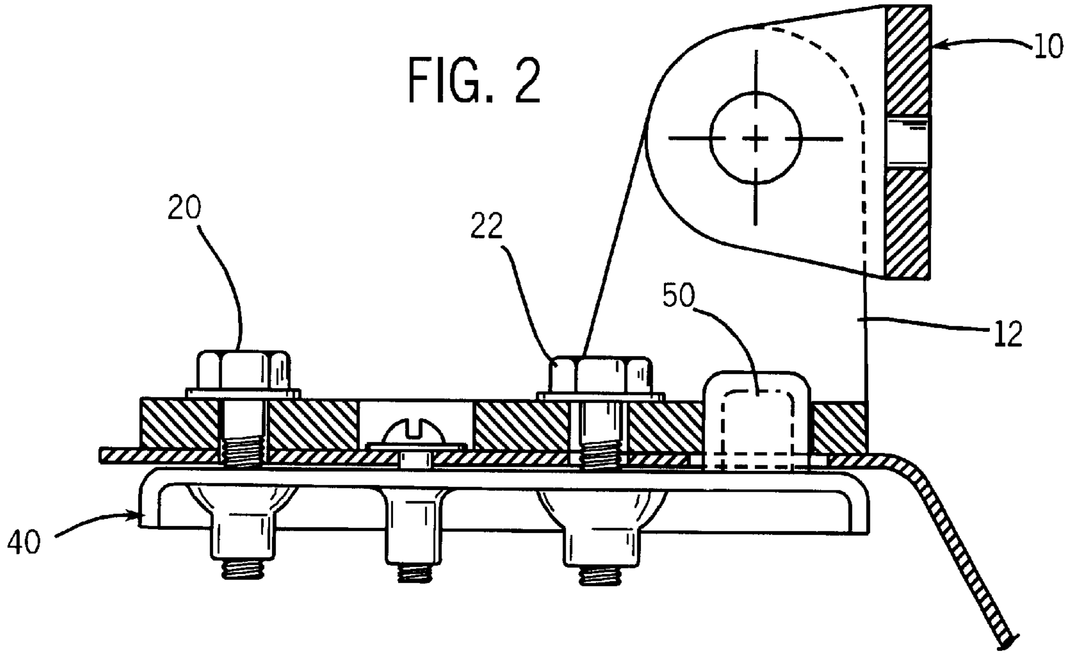

VEHICLE DOOR HINGE ATTACHMENT SYSTEM AND METHOD

BACKGROUND OF THE INVENTION

1. Field of the Invention

The present invention relates generally to means and method for relatively precisely attaching a vehicle door to the body frame during manufacture enabling removal of the door from the body frame for mounting accessories to the door and then readily remounting the door to the frame at the original attachment arrangement.

2. Description of Related Art

Manufacturing assembly of a vehicle door to the body frame involves two separate procedural operations, namely (1) precise mounting of the door to the frame so it will swing from a first fully open condition to a second position closing onto the body door opening, and (2) mounting a variety of accessories to the door (e.g., windows, door locks, internal leather or textile door covering). Due to manufacturing tolerances of parts and bolt hole locations, initial customized adjustment of the door to the body frame is required to insure proper fitting. Following the precise mounting of the door and frame to one another, it has been customary in the past to rust proof and paint the doors following which the doors were removed from the frame and accessories added at a different work station. Final remounting of the fully accessoried door to the vehicle frame in this case could result in damage to the door, accessories and adjacent body panels, if door realignment were required.

OBJECTS AND SUMMARY OF THE INVENTION

It is a primary object and aim of the invention to provide a means and method for initial mounting of an automotive vehicle door to the body frame in a predetermined precise arrangement which enables ready removal of the door from the frame for accessory mounting thereto and ease of reinstallation of the door to the predetermined arrangement without damaging the door or accessories.

Another object is the minimization of manufacturing reinstallation labor of an automotive vehicle door to the body while at the same time improving door fitment to the vehicle body.

Yet another object is the provision of improved means and method for manufacturing assembly of a door to an automotive vehicle body minimizing door and body damage during such assembly.

In accordance with the practice of a first embodiment of the present invention, one or more door hinges are adjustably secured to respective body frame parts (typically referred to as pillars) through the instrumentality of threaded bolts. More particularly, the hinges and pillars have slightly oversize openings which can be adjustably aligned with each other during assembly. In addition, a reinforcing nut plate has a set of threaded openings which can be aligned with the hinge and pillar openings for receiving the ends of the threaded bolts therein. On initial manufacturing assembly of the hinged pillar and nut plate, one or more bodies of hot melt adhesive are interposed between the nut plate and pillar. On subjecting the door to a standard rust proofing procedure (so-called "E-coating"), the associated elevated temperature activates the hot melt adhesive bodies so that the nut plate and pillar opposing surfaces are secured to one another in a predetermined desired arrangement. Accordingly, the bolts may now be removed and the door removed for adding accessories. Reassembly of the door with accessories will be in precise predetermined fitting arrangement not requiring realignment adjustments.

In a second embodiment, the pillar and a further plate are "spot" welded together instead of using a hot melt adhesive as in the first embodiment. A safety screw holds the welded assembly to the hinge when the bolts are reapplied.

DESCRIPTION OF THE DRAWINGS

In the accompanying drawing:

FIG. 1 is an elevational, partially sectional, exploded view of door hinge to pillar attachment parts in accordance with a first embodiment of the present invention;

FIG. 2 is an elevational view showing the door hinge attached in a predetermined fitting arrangement to a body pillar.

DESCRIPTION OF PREFERRED EMBODIMENTS

Figure 3:
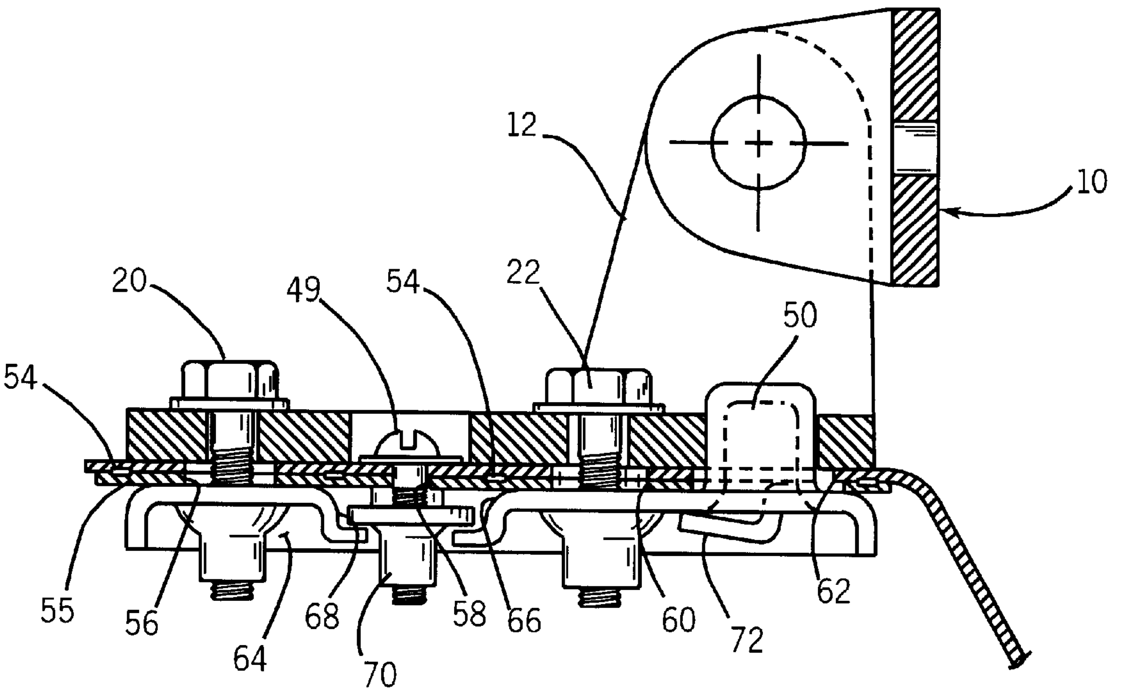
FIG. 3 is an elevational view of an alternative embodiment of the invention.

With respect to the drawings, and particularly FIG. 1, an automotive vehicle door 10 (shown schematically) includes one or more hinges 12, each rotatably interconnected thereto by a pivot pin or axle 14. The hinge includes a generally flat plate 15 which has a pair of closely toleranced openings 16 and 18 for receiving mounting bolts 20 and 22, respectively, therethrough. In addition, a pilot opening 24 and an oversize safety opening 26 are formed in the plate 15 for a purpose to be given later herein.

A vehicle body pillar 28 to which a door is typically attached extends generally vertically and is sufficiently rugged to withstand repeated opening and closing shocks resulting from usual car use. The pillar includes a relatively flat extent 30 in which oversize openings 32 and 34 are aligned with hinge openings 16 and 18 when a pilot opening 36 and safety opening 38 in the pillar are aligned with their correspondingly named openings in the hinge plate 15.

A stiffening and reinforcing nut plate 40 preferably roll-formed from a generally flat metal plate 42 includes first and second sleeves 44 and 46, dimensioned and threaded for receiving the end portions of bolts 20 and 22. A third threaded sleeve 48 extending in the same direction from the nut plate as sleeves 42 and 44, is adapted to align with the safety openings 26 and 36 in the hinge and pillar, respectively, and connectingly receive an end portion of a safety screw 49 therein.

A roll-formed pilot 50 is generally cylindrical and extends from a surface of the nut plate in a direction opposite to that of the sleeves 44 and 46.

For initial customized attachment, the pillar flat extent 30 is positioned onto the nut plate 40 with opening 38 received onto the cylindrical pilot 50 and openings 32 and 34 approximately aligned with nut plate threaded sleeves 44 and 46. A plurality of hot-melt adhesive bodies 52 are located between the pillar and nut plate and in good contact with each at this time. Next, the hinge plate 15 is mounted onto pilot 50, the bolts 20 and 22, and the safety screw 49 are lightly threaded onto the corresponding sleeves of the nut plate. At this time, customized positioning attachment is achieved for the door in the body door space (not shown) by shifting the parts as required, after which the bolts and safety screw are tightened. Rust proofing of the door (E-coating) and subsequent cure process are conducted which provides sufficient heat to activate the adhesive bodies and secure the pillar and nut plate at a predetermined precise attachment arrangement for the door to the vehicle body.

The bolts 20 and 21 are now removed enabling the door with hinge/s to be dismantled from the vehicle body for applying accessories (e.g., windows, locks, leather or textile interior panel). After the accessorising step, the door is once again mounted to the pillar by threading the bolts into place as previously described.

Turning now to FIG. 3, a second embodiment of the invention is shown in which the pillar and door hinge parts of the door mounting assemblage are identical to those of the first embodiment, and accordingly the parts are numbered identically. A fundamental difference is the spot-welding (e.g., regions 54) of a low-carbon steel plate 55 to the pillar 28, which plate 55 includes openings 56, 58, 60 and 62 aligned with corresponding pillar openings 32, 34, 36 and 38, instead of using the hot-melt adhesive bodies 52.

A nut plate 64 differs from the first described nut plate 40 in that the opening 66 includes a plurality of deformable tabs 68 which lockingly surround an enclosed nut 70 providing a so-called "floating" nut arrangement to which the safety screw 49 is threaded. Moreover, the plate 55 includes a hook-shaped tab 72 which extends through an opening in the nut plate 64 to secure the nut plate, plate 64 and pillar together.

As the name implies, the safety screw 49 in the second embodiment is kept in place on removal of the hinge for attaching accessories in order to maintain the precise original customized arrangement of the nut plate when the bolts are reapplied.

Although the application has been described in connection with preferred embodiments, it is to be understood that those skilled in the appertaining arts may contemplate changes that come within the spirit of the invention as described and set forth in the appended claims.

What is claimed is:

1. A system for initially precisely mounting an automotive vehicle door hinge to a body member having first and second mutually opposed surfaces, the system comprising:

a nut plate for contacting assembly to the second surface of the body member including a threaded member in substantial adjustable alignment with an opening in the body member; and a quantity of a material contacting the nut plate and the body member which becomes adhesive at an elevated temperature immovably securing the nut plate and body member to one another in a fixed predetermined arrangement.

2. The system of claim 1, in which the quantity of material includes a plurality of discrete amounts of the material in spaced apart relation.

3. The system of claim 2, in which the nut plate includes a generally cylindrical pilot which is located within further aligned openings in the pillar and hinge.

4. A system for mounting an automotive vehicle door to a surface of a vehicle body having first and second openings extending therethrough, comprising:

a threaded bolt;

a retaining screw;

a hinge connected to the door having a relatively flat mounting plate adapted for contacting the a surface of the vehicle body, the hinge having a first opening of such dimensions as to enable receipt of the bolt therethrough and a second opening of such dimensions as to receive tee screw therethrough, the openings in general alignment with respective pillar openings in the vehicle body;

a nut plate contacting a second surface of the vehicle body having fist and second threaded nut portions adjustably align able with the respective pillar openings;

a plurality of individual means contacting facing surfaces of the vehicle body and nut plate for fixedly adherently securing the vehicle body and nut plate in a predetermined arrangement enabling the bolt and screw to be received through the respective hinge and vehicle body openings and threaded into the nut portions.

5. The system of claim 4, in which the securing means include hot melt adhesive bodies that are activated to an adhesive condition by elevated temperature encountered during rust proofing.

6. The system of claim 4, in which the nut plate further includes a generally cylindrical pilot that is received through a further aligned openings in the vehicle body and hinge.

7. The system of claim 1, wherein the nut plate is positionable with respect to the body member by securement of a threaded fastener into the threaded members.

8. The system of claim 1, wherein the body member is a vehicle door pillar and wherein the second surface is substantially flat for abutting the nut plate.

9. The system of claim 1, wherein the quantity of material includes a plurality of adhesive bodies.

10. The system of claim 1, wherein the threaded member is a nut.

11. The system of claim 6, wherein the hinge and nut plate are customizedly positionable with respect to the vehicle body, and wherein the means for fixedly adherently securing maintain the nut plate in a desired position following removal of the bolt and screw therefrom.

12. The system of claim 4, wherein the nut plate is configured for securing to a pillar of the vehicle body.

13. A method for securing a vehicle hinge to a vehicle body, the method comprising:

mounting a hinge member on a first side of a body member;

mounting a nut plate on a second side of the body member opposite the first side;

disposing an adhesive material between the nut plate and the second side of the body member;

customizedly positioning the hinge member and the nut plate with respect to the body member;

temporarily securing at least one fastener between the hinge member and the nut plate;

elevating the temperature of the adhesive material to secure the nut plate to the second side of the body member; and removing the hinge member and the at least one fastener.

14. The method of claim 13, wherein the adhesive material comprises a plurality of hot melt adhesive bodies.

15. The method of claim 13, wherein the nut plate includes an integral threaded surface for receiving the at least one fastener.

16. The method of claim 13, wherein the at least one threaded member is received through an opening in the body member sized to permit customized positioning of the hinge member and body member.

17. The method of claim 13, wherein the body member is a pillar for supporting a vehicle door.

18. The method of claim 13, wherein the body member includes a substantially flat surface for receiving the nut plate.

19. The method of claim 13, comprising the further step resecuring the hinge member to the body member.

20. The method of claim 19, wherein the hinge member is removably secured to the body member via a plurality of threaded fasteners.

* * * * *